United States Patent
Khamesra et al.

(10) Patent No.: US 11,736,023 B2
(45) Date of Patent: Aug. 22, 2023

(54) COMMUNICATING FAULT INDICATIONS BETWEEN PRIMARY AND SECONDARY CONTROLLERS IN A SECONDARY-CONTROLLED FLYBACK CONVERTER

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 92 days.

(21) Appl. No.: 17/197,309

(22) Filed: Mar. 10, 2021

(65) Prior Publication Data
US 2021/0344267 A1 Nov. 4, 2021

Related U.S. Application Data

(63) Continuation of application No. 16/454,616, filed on Jun. 27, 2019, now Pat. No. 10,951,107.

(51) Int. Cl.
*H02M 3/335* (2006.01)
*H02M 1/32* (2007.01)
*H02M 1/08* (2006.01)

(52) U.S. Cl.
CPC ......... *H02M 3/33523* (2013.01); *H02M 1/32* (2013.01); *H02M 3/33592* (2013.01); *H02M 1/08* (2013.01)

(58) Field of Classification Search
CPC .................................................. H02M 1/32
See application file for complete search history.

(56) References Cited

U.S. PATENT DOCUMENTS

| | | | |
|---|---|---|---|
| 5,757,627 A * | 5/1998 | Faulk | H02M 3/33576 363/21.16 |
| 10,277,130 B2 * | 4/2019 | Quigley | H02M 1/32 |
| 11,095,226 B2 * | 8/2021 | Arima | H02M 3/33523 |
| 2011/0305043 A1 * | 12/2011 | Matsumoto | H02M 3/33592 363/21.01 |
| 2016/0149504 A1 * | 5/2016 | Quigley | H02M 3/33546 363/21.04 |
| 2016/0352231 A1 * | 12/2016 | Quigley | H02M 1/36 |
| 2016/0352237 A1 * | 12/2016 | Quigley | H02M 1/08 |

(Continued)

*Primary Examiner* — Gustavo A Rosario-Benitez

(57) ABSTRACT

Communicating fault conditions between primary-side and secondary-side controllers of a Universal Serial Bus Power Delivery (USB-PD) device is described. The primary-side controller receives a control signal from the secondary-side controller across a galvanic isolation barrier. The primary-side controller converts the control signal into a first pulse signal and applies the first pulse signal to control a primary-side switch. When the primary-side controller detects that a first fault condition has occurred, the primary-side controller communicates a first information signal about the first fault condition to the secondary-side controller across the galvanic isolation barrier. The first information signal is generated by converting the control signal into a second pulse signal having a different pulse width than the first pulse signal. The primary-side controller applies the second pulse signal to control the primary-side power switch.

16 Claims, 10 Drawing Sheets

(56) References Cited

U.S. PATENT DOCUMENTS

| | | | | |
|---|---|---|---|---|
| 2017/0155335 A1* | 6/2017 | Chang | ...................... | H02M 1/36 |
| 2018/0159434 A1* | 6/2018 | Werner | ............. | H02M 3/33561 |
| 2018/0367045 A1* | 12/2018 | Zhang | ...................... | H02M 1/08 |
| 2019/0149056 A1* | 5/2019 | Zheng | ................... | H02J 7/0036 |
| | | | | 363/21.13 |

* cited by examiner

COMMUNICATING FAULT INDICATIONS BETWEEN PRIMARY AND SECONDARY CONTROLLERS IN A SECONDARY-CONTROLLED FLYBACK CONVERTER

This application is a Continuation Application of U.S. patent application Ser. No. 16/454,616, filed on Jun. 27, 2019, which is incorporated by reference herein in its entirety.

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification, however, allows power providers and power consumers to dynamically negotiate the levels of the provided voltages and currents. Under certain power delivery conditions, fault conditions can occur on the provided voltages/currents from the power provider, as well as other fault conditions can occur on the provided voltages/currents received by the power consumer.

BRIEF DESCRIPTION OF THE DRAWINGS

The disclosure is illustrated by way of example, and not of limitation, in the figures of the accompanying drawings.

DETAILED DESCRIPTION

Figure 1:
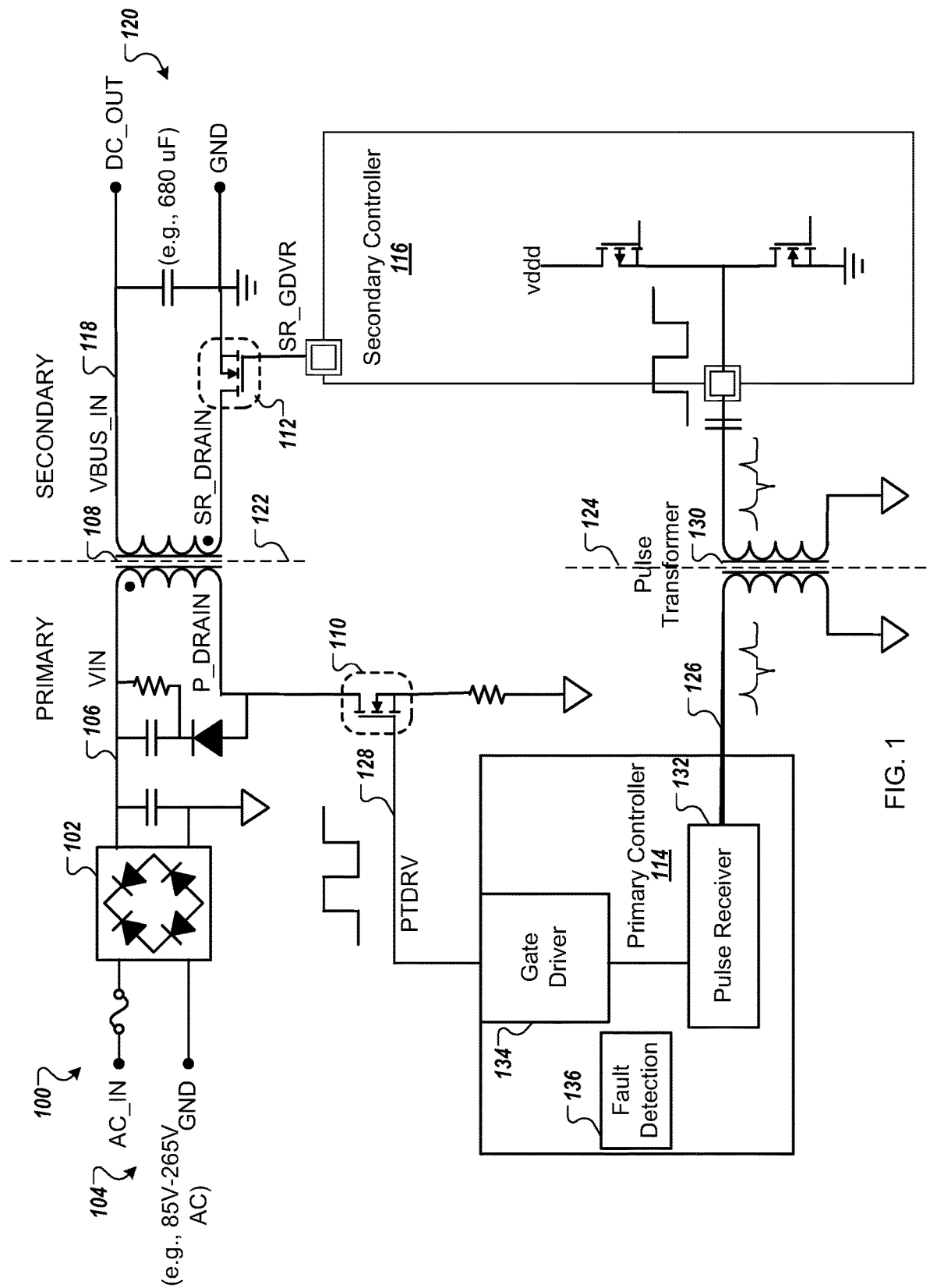
FIG. 1 is a block diagram of a secondary-controlled flyback converter with bi-directional communications over a galvanic isolation barrier according to one embodiment.

The following description sets forth numerous specific details such as examples of specific systems, components, methods, and so forth, in order to provide a good understanding of various embodiments of the techniques described herein for communicating information, such as fault indications, between primary integrated circuit (IC) and secondary IC in secondary-controlled flyback converters, such as used in USB power delivery applications. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for communicating fault indications between a primary integrated circuit (IC) and a secondary IC in secondary-controlled flyback converters coupled to power lines in electronic devices in USB-PD. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., hubs, docking stations, adapters, chargers, etc.), audio/video/data recording and/or playback devices (e.g., cameras, voice recorders, hand-held scanners, monitors, etc.), and other similar electronic devices that can use USB connectors (interfaces) for communication, battery charging, and/or power delivery.

A USB-enabled electronic device or a system may comply with at least one release of a Universal Serial Bus (USB) specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C, is defined in various releases and/or versions of the USB Type-C specification (e.g., such as Release 1.0 dated Aug. 11, 2014, Release 1.1 dated Apr. 3, 2015, etc.). The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification (e.g., such as Revision 1.0 released Jul. 5, 2012, Revision 2.0 released Aug. 11, 2014, etc., or later revisions/versions thereof). The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc.

According to the USB-PD specification, an electronic device is typically configured to deliver power to another device through a power path configured on a USB VBUS line. The device that provides power is typically referred to as (or includes) a "provider" (or a power source), and the device that consumes power is typically referred to as (or includes) a "consumer" (or a power sink). A power path typically includes a power switch coupled in-line on the VBUS line and configured to turn the delivery of power on and off.

A USB-PD power source may be configured to draw power from an alternating current (AC) power adapter or from another AC source. Thus, as part of an alternating current-to-direct current (AC-DC) conversion, some implementations may use a large bulk capacitor on the power source side of the VBUS line in order to remove the AC component of the power signal. Turn-ON and turn-OFF of power switches (also referred to as power FETs) may allow for further circuit protection based on analysis of current and voltage conditions and the detection of faults.

These fault conditions in current systems cannot be communicated between the primary side of the power provider and the secondary side of the power provider without an additional communication channel and a protocol to synchronize transmit versus receive to avoid data collision on the additional communication channel. For example, in a secondary-controlled power adapter (also referred to herein as a secondary-controlled power converter), a pulse transformer can be used to transfer pulse width modulation (PWM) pulse information from a secondary-side controller (also referred to as secondary IC or secondary controller) to a primary-side controller (also referred to as primary IC or primary controller) to turn-on or turn-off the primary-side FET using pulses (e.g., +ve and −ve pulses) for a high-going edge and a low-going edge, respectively. As a "1" gets defined as positive pulse and "0" as negative pulse, it is not possible to send any other pattern (like 0 0) from secondary-side controller to primary-side controller unless there is a faster frequency synchronized clock available in the primary-side controller to detect the pattern. This requires logic on the primary side and a huge area increase due to higher technology nodes (e.g., 0.5 um to 1 um nodes). Hence, a fault happening on the secondary side cannot be communicated, except by stopping the PWM pulses. If the primary-side controller does not receive the PWM pulses via the pulse transfer, it goes into a soft-start mode and performs multiple soft-start operations (for a few seconds) before latching off, which will stop the converter. It should be noted that the pulses can be other types of pulses than PWM pulses.

Similarly, to transfer any information (e.g., faults like over-voltage (OV), under-voltage (UV), over-current (OC), short-circuit detection, over-temperature (OT), or other information like line voltage, peak current limits, or the like) from the primary-side controller to the secondary-side controller, the system would require either another pulse transformer or input buffers in both the primary and secondary-side controllers along with a protocol to synchronize transmit versus receive to avoid data collision which would require logic and circuits in both controllers. The additional logic and circuits can add to die size, especially for the primary-side controller due to higher technology nodes. Also, there may be additional cost of using another pulse transformer to communicate fault from the secondary-side controller to primary-side controller or from the primary-side controller to the secondary-side controller. There may also be additional cost of using bidirectional input and output buffers with collision detection if a single pulse transformer were to be used for bi-directional communications.

Described herein are various embodiments of techniques for communicating fault indications between primary and secondary-side controllers in secondary-controlled flyback converters. The embodiments described herein may address the above-mentioned and other challenges by providing fault indications across a galvanic isolation barrier in a bi-directional manner and without the additional logic and circuits and complicated protocols described above. In some cases, the embodiments can provide bi-directional communications of information, such as fault information, between the primary and secondary-side controllers in a secondary-controlled flyback converter. For example, a hardware or firmware controlled scheme can define a system shutdown using multiple consecutive pulse (e.g., +ve or −ve pulses) given across a galvanic isolation barrier, such as across a pulse transformer, to notify the primary-side controller of a fault occurring on the secondary side (i.e., detected by the secondary-side controller). The primary-side controller can shut down immediately in response to the notification and does not need to perform a soft start again. Similarly, a hardware- or firmware-controlled scheme can transfer information from the primary-side controller to the secondary-side controller over a galvanic isolation barrier, such as across a pulse transformer and a flyback transformer, without adding input and output buffers or a complicated protocol as described in more detail below. With the bi-directional communications, such as through i) a pulse transformer or ii) a pulse transformer and a flyback transformer, information can be passed from the primary-side controller to the secondary-side controller and from the secondary-side controller to the primary-side controller to either protect the system or to optimize performance of the system.

The embodiments described herein may address the above-mentioned and other challenges by providing, a serial bus-compatible power supply device, such as a serial bus power delivery (SBPD) device with a power control analog subsystem having hardware, firmware, or any combination to communicate information, including fault information over a galvanic isolation barrier. The SBPD (also referred to as "source device" herein) may be a USB compatible power supply device.

FIG. 1 is a block diagram of a secondary-controlled flyback converter 100 with bi-directional communications over a galvanic isolation barrier according to one embodiment. The secondary-controlled flyback converter 100 can be part of an AC-DC power adapter device. The secondary-controlled flyback converter 100 includes a rectifier 102 (e.g., full-bridge rectifier) coupled between AC input terminals 104 and a rectified DC line 106 (VIN), a flyback transformer 108, the flyback transformer 108 including a primary winding coupled to the rectified DC line 106, a primary-side power switch 110 (e.g., a primary-side field effect transistor (FET), a power FET, or a primary FET), a secondary-side power switch 112 (e.g., secondary-side FET 112, power FET, or secondary FET), a primary-side controller 114, and a secondary-side controller 116. The rectified DC line 106 is coupled to a first end of a primary winding of the flyback transformer 108. VIN is the voltage on the AC line-in after the rectifier 102. A second end of the primary winding is coupled to a primary drain of the primary-side FET 110 (also referred to a power switch herein). A first end of the secondary winding of the flyback transformer 108 is coupled to a direct current (DC) output line 118 (VBUS) and a second end of the secondary winding is coupled to a secondary drain of the secondary-side FET 112 (SR_Drain). VBUS is voltage on the DC output of the flyback transformer 108. SR_Drain is the drain node of the secondary-side FET 112. The DC output line 118 and the secondary-side FET 110 are coupled to DC output terminals 120.

The secondary-controlled flyback converter 100 is used for AC-DC conversion with galvanic isolation between the inputs and any outputs. The secondary-controlled flyback converter 100 uses an inductor split with the flyback transformer 108 with a galvanic isolation barrier 122 between a primary side and a secondary side. When the primary-side power switch 110 (the primary-side FET) is closed, the primary-side of the flyback transformer 108 is connected to the input voltage source. In this embodiment, the primary-side of the flyback transformer 108 is coupled to the rectifier 102. As the primary current and magnetic flux in the flyback transformer 108 increases, energy is stored in the transformer core of the flyback transformer 108. The voltage induced in the secondary winding is negative and blocked. When the primary-side power switch 110 (the primary-side FET) is opened, the primary current and magnetic flux drops. The secondary voltage is positive, allowing current to flow from the flyback transformer 108. The energy from the transformer core supplies an output load. An output capacitor can be used to charge and supply energy to the output load. Thus, the flyback transformer 108, based on control of the primary-side power switch 110 can store energy and transfer the energy to the output of the secondary-controlled flyback converter 100. It should also be noted that the secondary-controlled flyback converter 100 can include other components in the input stage, in the output stage, or in both. For example, a bulk capacitor can be coupled between the output of the rectifier 102 and a ground node. During operation, the AC input power is rectified and filtered by the rectifier 102 (bridge rectifier) and the bulk capacitor. This creates a DC high voltage bus which is connected to the primary winding of the flyback transformer 108. Similarly, in the output stage, the secondary winding power is rectified and filtered, such as by a diode, a capacitor, output LC-filters, or the like, to reduce the output voltage ripple. Other output voltages can also be realized by adjusting the flyback transformer's turn ratio and the output stage.

The secondary-controlled flyback converter 100 operates as an isolated power converter. The two prevailing control schemes are voltage mode control and current mode control. Both control schemes use a signal related to the output voltage. In one approach, an opto-coupler is coupled to the secondary-side controller 116 and sends a signal to the primary-side controller 114 to indicate the output voltage. The opto-coupler can be used to obtain tight voltage and current regulations.

Conventional systems allow a primary-side controller to initiate an auto-restart operation after a specified period of time (e.g., time>tAR, where tAR is 82 msec) when the secondary-side controller has not sent any requests for switching cycles. However, some faults can persist for a longer duration, even though the secondary-side controller has detected the fault and taken the action. In a worst-case, the auto-restart operations after a specified period of no requests can damage the system. The primary-side controller can sense line-in voltage/current related information prior to the secondary-side controller. But, with the one-way communication, such as through an opto-coupler, there is no information which can be passed from the primary to secondary-side controllers to either protect the system or to optimize performance of the system.

In the depicted embodiment, the primary-side controller 114 (also referred to as primary IC) and the secondary-side controller 116 (also referred to as secondary IC) are configured for bi-directional communications over the galvanic isolation barrier 122, over a galvanic isolation barrier 124, or both. In one embodiment, the primary-side controller 114 is configured to receive a signal 126 from the secondary-side controller 116 across the galvanic isolation barrier 124. The primary-side controller 114 applies a pulse signal 128 to the gate of the primary-side FET 110, in response to the signal 126 to turn-on and turn-off the primary-side FET 110. The primary-side controller 114 can communicate information to the secondary-side controller 116 across the galvanic isolation barrier 122 via the flyback transformer 108 by varying a first pulse width of the pulse signal 128 to a second pulse width and applying the pulse signal 128 with the second pulse width to the primary-side FET 110.

In one embodiment, secondary-controlled flyback converter 100 includes a pulse transformer 130 coupled between the primary-side controller 114 and the secondary-side controller 116. The primary-side controller 114 is configured to receive the signal 126 from the secondary-side controller 116 as one or more pulses via the pulse transformer 130. The primary-side controller 114 can include a receiver, such as a pulse receiver 132 to receive the pulse signal 128 from the secondary-side controller 116 across the galvanic isolation barrier 124. The pulse receiver 132 can change the primary-side turn-on pulse based on output of the flyback transformer 108 (e.g., Error Amplifier (EA) output). The primary-side turn-on pulse is used to turn-on the primary-side FET 110. With higher EA voltages, wider PWM pulse are sent from secondary-controller 116 via pulse transformer 130 which results in wider primary turn-on pulses being used. The primary-side controller 114 can also include a gate driver 134 coupled to the pulse receiver 132 and a gate of the primary-side FET 110. As described herein, the turn-on and turn-off pulses can have fixed widths or variable widths. In one embodiment, the pulse receiver 132 can include a pulse width modulation (PWM) circuit. Alternatively, the pulse receiver 132 can use other types of circuits to receive the pulses across the galvanic isolation barrier 124.

In one embodiment, the primary-side controller 114, in order to apply the pulse signal 128 to the primary-side FET 110, is configured to receive a turn-on pulse (PTDRV) from the secondary-side controller 116. The primary-side controller 114 applies the turn-on pulse to the gate of the primary-side FET 110 via the gate driver 134. The turn-on pulse causes the primary drain of the primary-side FET 110 to go low (e.g., a first voltage level corresponding to a first state or representing the digital value of one) and the secondary drain of the secondary-side FET 112 to go high. Subsequently, the primary-side controller 114 receives a turn-off pulse from the secondary-side controller 116 and applies the turn-off pulse to the gate of the primary-side FET 110 via the gate driver 134. The turn-off pulse causes the primary drain of the primary-side FET 110 to go high (e.g., a second voltage level corresponding to a second state or representing the digital value of zero) and the secondary drain of the secondary-side FET 112 to go low. As illustrated and described with respect to FIG. 2, the secondary-side controller 116 is configured to detect the secondary drain going low using negative sensing (NSN). Alternatively, the secondary-side controller 116 can include zero-crossing detect (ZCD) circuitry to detect the negative voltage on the secondary drain. The secondary-side controller 116 can determine an amount of time between a beginning of the turn-off pulse (PTDRV) and the NSN going high. The amount of time corresponds to a fixed time when the pulse signal includes the first pulse width between the turn-on pulse and the turn-off pulse. The amount of time can also correspond to an extended time when the pulse signal includes the second pulse width between the turn-on pulse and the turn-off pulse. For example, if the second pulse width is extending an amount of time, Td, the extended time measured by the secondary-side controller 116 is at least this amount of time, Td. In another embodiment, the secondary-side controller 116 can determine that the amount of time extends by a specified amount of time less than a fixed time corresponding to a normal mode. When the amount of time is the specified amount of time that is greater than the fixed time, the secondary-controller 116 can receive information from the primary-side controller 114, such fault information, such as described herein.

Figure 2:
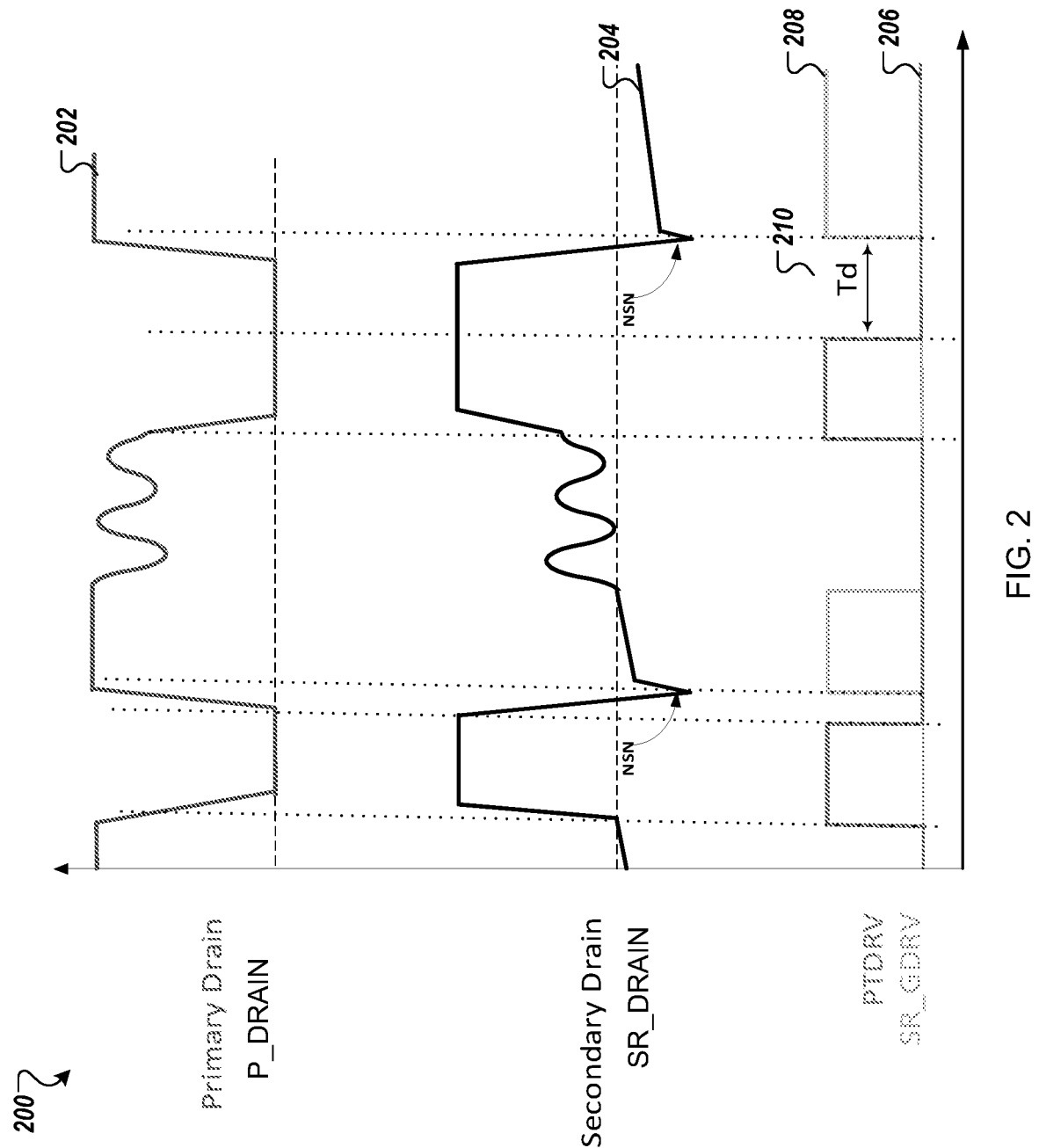
FIG. 2 is a waveform diagram illustrating a primary drain signal, a secondary drain signal, a primary FET driver signal, and a synchronous rectification (SR) driver signal for communicating information from a primary-side controller to a secondary-side controller of a secondary-controlled flyback converter according to one embodiment.

In another embodiment, the primary-side controller 114 includes a fault detection circuit 136 to detect a fault condition. Fault conditions can occur on the provided voltages/currents from the power provider and fault conditions can occur on the provided voltages/currents received by the power consumer. The primary-side controller 114, in response to the fault condition being detected by the fault detection circuit 136, communicates information about the fault condition to the secondary-side controller 116 across the galvanic isolation barrier 122 via the flyback transformer 108 by varying the first pulse width of the pulse signal to the second pulse width and applying the pulse signal with the second pulse width to the primary-side FET 110, such as illustrated in FIG. 2. The change in the pulse width can be detected by the secondary-side controller 116 to receive the information about the fault condition.

In a further embodiment, the fault detection circuit 136 can detect different types of fault conditions and send different information about the respective fault condition to the secondary-side controller 116. For example, the fault detection circuit 136 can detect a first fault condition at a first instance and a second fault condition at a second instance. The primary-side controller 114, in response to the first fault condition being detected, communicates information about the first fault condition to the secondary-side controller 116 across the flyback transformer 108. The primary-side controller 114, in response to the second fault condition being detected, communicates information about the second fault condition to the secondary-side controller 116 across the flyback transformer 108.

In a further embodiment, to communicate the information to the secondary-side controller 116 across the flyback transformer 108, the primary-side controller 114 varies the first pulse width of the pulse signal to generate a specific pattern in the pulse signal 128. The specific pattern in the pulse signal 128 corresponds to a fault condition being communicated by the primary-side controller 114.

It should be noted that the embodiments described above with respect to FIG. 1 are directed to the primary-side controller 114 communicating information to the secondary-side controller 116. In other embodiments, the secondary-side controller 116 can communicate information to the primary-side controller 114 over the galvanic isolation barrier 124, such as via the pulse transformer 130. Additional details of these embodiments are described below with respect to FIG. 3. As noted above, the information communicated over the flyback transformer 108 can be detected by the secondary-side controller 116, such as illustrated in the waveform diagram of FIG. 2.

FIG. 2 is a waveform diagram 200 illustrating a primary drain signal 202, a secondary drain signal 204, a primary FET driver signal 206, and a synchronous rectification (SR) driver signal 208 for communicating information from a primary-side controller to a secondary-side controller of a secondary-controlled flyback converter according to one embodiment. Referring back to FIG. 1, the primary drain signal 202 is the signal on the primary drain of the primary-side FET 110 and the primary FET driver signal 206 (PTDRV) is the signal on the gate 128 of the primary-side FET 110 provided by the primary-side controller 114. The secondary-side controller 116 is configured to detect the secondary drain signal 204 going low and ultimately crossing zero to become a negative voltage. The secondary drain signal 204 starts to increase when the primary Drain 202 goes low and the secondary drain signal 204 (SR_DRAIN) eventually starts to go low and crosses zero in the opposite direction when Primary Drain 202 starts to go high. The SR driver signal 208 is high between the secondary drain signal 204 going negative followed by starting to increase to the secondary drain signal 204 crossing zero towards positive side. The secondary-side controller 116 can use a timer (or counter) to keep a count for an amount of time between the primary FET driver signal 206 going low (as controlled by the secondary-side controller 116) to the NSN going high (increasing from a minimum value after crossing zero).

For one secondary controlled fly-back converter, the primary FET turns-on and turns-off based on +ve/−ve pulses sent via pulse transformer 130 from the secondary-side controller 116. Turning off the primary FET causes the SR_DRAIN signal to go low which gets detected using NSN as shown in the waveforms of FIG. 2. Here, the PTDRV signal is the primary FET turn-on pulse sent by secondary-side controller 116 via pulse transformer 130. A timer keeps a count for the time between PTDRV going low to NSN going high. In a normal case, a delay between PTDRV going low to NSN going high would be a fixed amount of time based on external components. For a fault condition, the primary-side controller 114 can extend the PTDRV pulse it receives by an extended amount of time, Td (e.g., 200 ns, 500 ns, 1 µs, or the like). The extended amount of time can be programmable. The extended amount of time, Td, can be detected by the secondary-side controller 116 using the timer between PTDRV going low (on secondary side) to NSN going high which is now extended by the extend amount of time 210, Td. Hence, the secondary-side controller 116 can know that the primary-side controller 114 is communicating information, such as fault information across the flyback transformer 108.

In some embodiments, based on pre-defined time-duration (Td) for different fault or information scenarios, the primary-side controller 114 can communicate to the secondary-side controller 116 by extending the PTDRV pulse width. This can be extended to other possible ways of altering PTDRV pulse to communicate this information or additional information, such as different fault types, or the like. In other embodiments, the primary-side controller 114 can narrow the PTDRV pulse width by pushing out a rising edge. In other embodiments, the PTDRV pulse can be split into two fixed widths (e.g., e.g., 100 ns). In other embodiments, the primary-side controller 114 can mask the PTDRV pulse fully.

Figure 3:
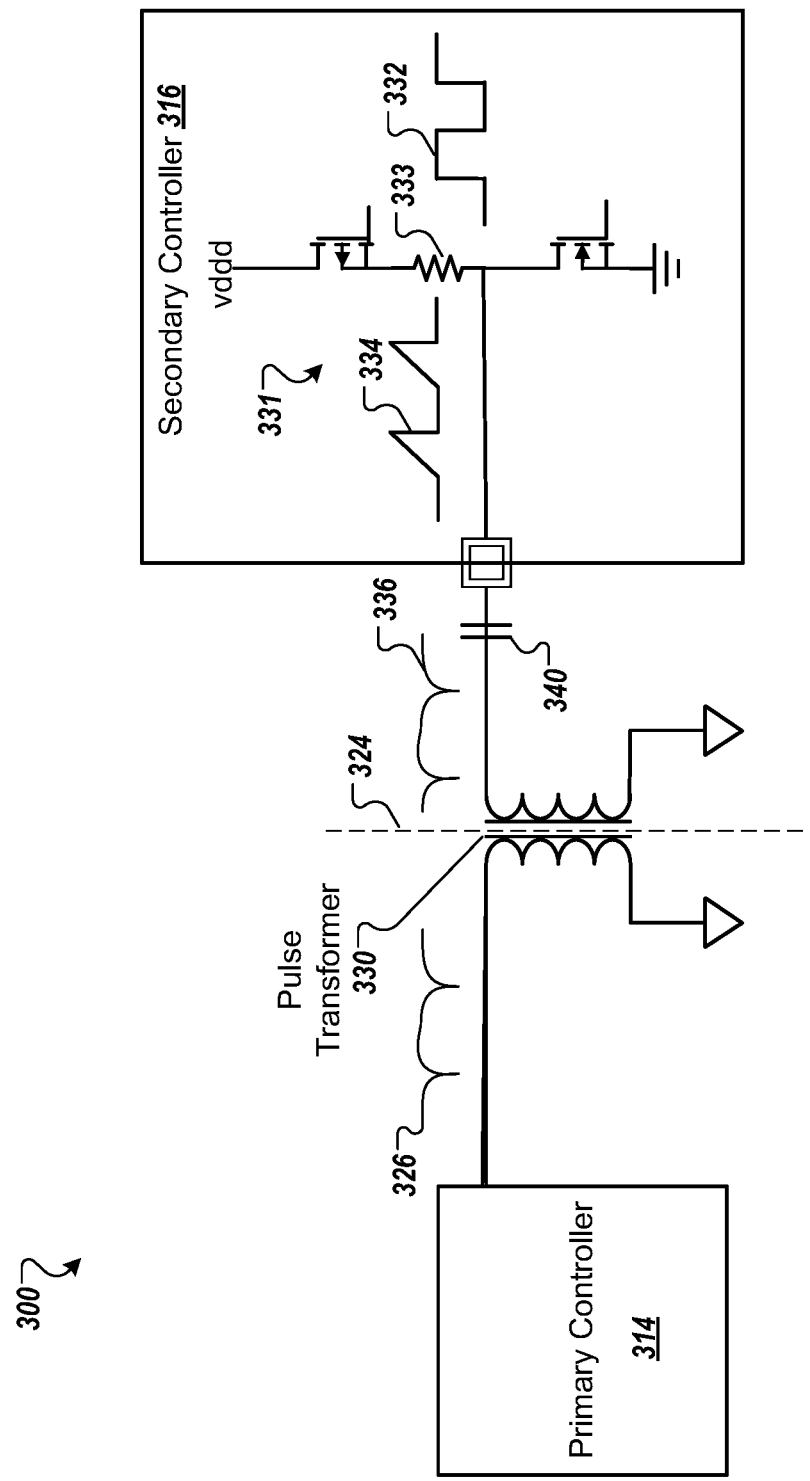
FIG. 3 is block diagram of a secondary-controlled flyback converter with a secondary-side controller that communicates information to a primary-side controller over a galvanic isolation barrier according to one embodiment.

As noted above, the secondary-side controller 116 can communicate information to the primary-side controller 114 over the galvanic isolation barrier 124, such as via the pulse transformer 130 such as described with respect to FIG. 3.

FIG. 3 is block diagram of a secondary-controlled flyback converter 300 with a secondary-side controller 316 that communicates information to a primary-side controller 314 over a galvanic isolation barrier 324 according to one embodiment. Although not all components of the secondary-controlled flyback converter 300 are shown, the secondary-controlled flyback converter 300 is similar to the secondary-controlled flyback converter 100 of FIG. 1 as noted by similar reference numbers. To control the flyback transformer via the primary-side power switch (not illustrated in FIG. 3), the secondary-side controller 316 can send pulses to the primary-side controller 314 across a galvanic isolation barrier 324, such as via a pulse transformer 330.

The secondary-side controller 316 includes a signal generator 331 to generate pulses to control the primary-side FET 110 via the pulse transformer 330. For example, the signal generator 331 can include a pull-up transistor and a pull-down transistor. The pull-up and pull-down transistors can be controlled by control logic or firmware of the secondary-side controller 316. During a normal mode, the signal generator 331 can generate and output a square wave signal. A capacitor 340 is coupled between the signal generator 331 and the pulse transformer 330. The capacitor 340 generates a positive pulse on a positive transition of the square wave signal (i.e., rising edge) and a negative pulse on a negative transition of the square wave signal (i.e., falling edge). The positive and negative pulses are transferred to the primary-side controller 314 via the pulse transformer 330. The primary-side controller 314 receives the positive and negative pulses to turn-on and turn-off the primary-side power switch (not illustrated in FIG. 3). Example waveforms of the square wave generated by the signal generator 331 are shown in FIG. 1. Example waveforms of the positive and negative pulses, generated by the capacitor are shown in FIG. 1. The secondary-side controller 316 can generate the square wave signal during normal operation (e.g., in a normal operating mode). The secondary-side controller 316 can detect a fault condition or otherwise needs to communicate information to the primary-side controller 314. In such cases, the secondary-side controller 316 can switch a resistor 333 between the pull-up transistor and the capacitor 340. It should be noted that the resistor 333 can be any type of resistive element. As a result, the signal generator 331 generates a sawtooth wave signal 334 with a slow rising edge and a faster falling edge than the slow rising edge. Given the edges of the sawtooth wave signal 334, the capacitor 340 does not generate a positive pulse for each pulse in the sawtooth wave signal 334, creating a pulse signal 336 with two or more consecutive negative pulses. The consecutive negative pulses of the pulse signal 336 are transferred to the primary-side controller 314 via the pulse transformer 330. The primary-side controller 314 receives the consecutive negative pulses to detect that the secondary-side controller 316 is communicating information to the primary-side controller 314. For example, the information may include fault information. In response to the primary-side controller 314 detecting the fault information, the primary-side controller 314 can perform actions in response to the fault. Although the pulse signal 336 includes two consecutive negative pulses (i.e., without any intervening positive pulses), which can represent two consecutive "0" values being sent across the galvanic isolation barrier 324, in other embodiments, other specific patterns can be generated by the secondary-side controller 316 and detected by the primary-side controller 314. For example, the secondary-side controller 316 can extend the signal generator 331 to generate two or more consecutive "1" values or even a pattern of 0s and 1s to give multiple fault conditions or other information from the secondary-side controller 316 to the primary-side controller 314. The other information may include a Start pattern, a Stop pattern, a Soft Fault asking for a soft-start operation, a Soft Fault asking for a minimum power delivered, or the like.

In some cases, two consecutive 0s requires two "−ve" pulses which then would not require any fast clock synchronization on the primary side. The two consecutive 0s can be initiated by firmware after confirming a fault which requires system shutdown. The pull-up transistor and pull-down transistor can be controlled for a programmable slow pull-up at the input of the pulse transformer 330, followed by a sudden pull-down, resulting in "−ve" edge without a "+ve" edge. Similarly, another programmable slow pull-up followed by sudden pull-down would result in another "−ve" edge. It should be noted that the slow pull-up can be realized by switching the resistor 333 into the pull-up path. Similarly, a resistor in series with a pull-down device can be used to generate consecutive 1s. Alternatively, the slow pull-up can be realized by a current source based pull-up.

Figure 4:
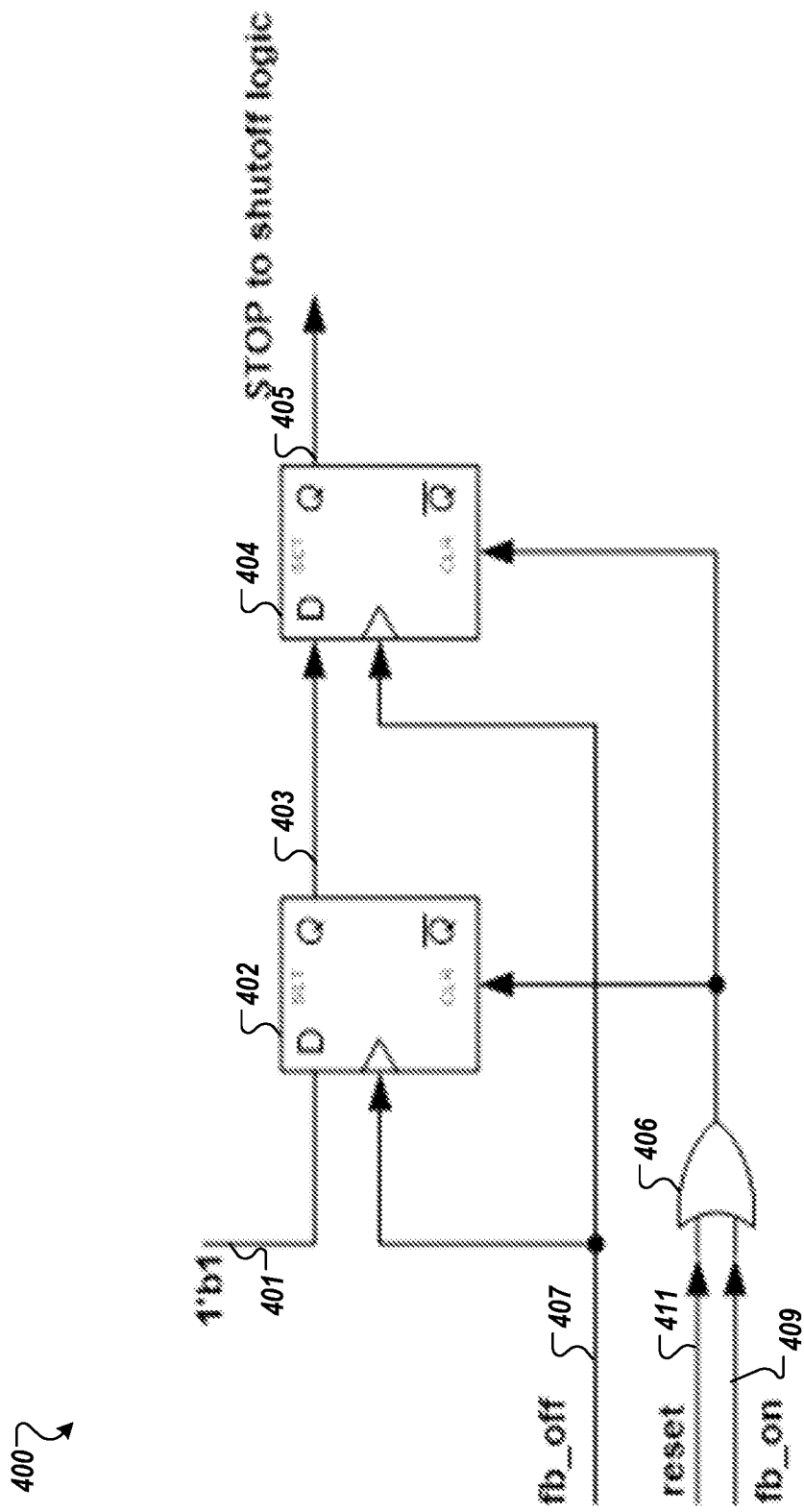
FIG. 4 is a block diagram of a circuit of a primary-side controller to detect a signal pattern from a secondary-side controller to disable shutoff logic of the primary-side controller according to one embodiment.

As illustrated in FIG. 3, the secondary-side controller 316 sends two consecutive 0s in the pulse signal 336 and the primary-side controller 314 receives two consecutive 0s in the pulse signal 326. The primary-side controller 314 can include circuitry to detect the two consecutive 0s in the pulse signal 326, such as illustrated in FIG. 4. Alternatively, the primary-side controller 314 can include circuitry to detect other patterns to detect information being communicated by the secondary-side controller 316.

FIG. 4 is a block diagram of a circuit 400 of a primary-side controller to detect a signal pattern from a secondary-side controller to disable shutoff logic of the primary-side controller according to one embodiment. The circuit 400 includes a first flip-flop 402, a second flip-flop 404, and an OR gate 406. The first flip-flop 402 receives a first input value 401 (e.g., 1'b1) that would stop the shutoff logic if propagated through both the first flip-flop 402 and the second flip-flop 404. The second flip-flop 404 receives a second input value 403 from an output of the first flip-flop 402 when the first flip-flop 402 is clocked by a high going pulse 407 corresponding to a 0 pulse 326 (negative pulse in FIG. 3) in the pulse signal received by the primary-side controller. The second flip-flop 404 outputs an output value 405 when the second flip-flop 404 is clocked by a high going pulse 407 corresponding to a 0 pulse 326 (negative pulse in FIG. 3) in the pulse signal received by the primary-side controller. However, if an intervening high going pulse (positive pulse) at the input of primary controller from the pulse transformer 330 which corresponds to a high going pulse 409 is received by the primary-side controller between the two 407 pulses, the first and second flip-flops are cleared. For example, when the OR gate 406 receives the high pulse 409 or a reset signal 411, the OR gate 406 can output a reset (or clear) signal to the clear inputs of both the first flip-flop 402 and second flip-flop 404. Although FIG. 4 shows one embodiment of the circuit 400 to detect two consecutive zeros, in other embodiments, the circuit 400 can include different logic or circuit components to detect the two consecutive zeros or other specific patterns in the pulse signal received by the primary-side controller across the galvanic isolation barrier.

In this embodiment, the output value 405 can send a "STOP" signal to shutoff logic of the primary-side controller to shut down the converter. For example, the primary-side controller can include shutoff logic that can perform a soft-start operation in certain conditions, such as when the primary-side controller is not receiving pulses to switch the primary-side switch (e.g., primary-side FET). Shutoff logic can initiate an auto-restart operation after a specified period of time (e.g., time>tAR, where tAR is 82 msec) when the secondary-side controller has not sent any requests for switching cycles. However, in some cases, the secondary-side controller can be sending information, such as fault information, in a manner that is dissimilar to the requests for the switching cycles. In order to avoid the shutoff logic performing some action when the secondary-side controller is sending information, the shutoff logic can be given signals or instructions by the circuit 400 when the specified pattern is detected, such as the two consecutive zeros illustrated in FIG. 4) to either shutdown the AC-DC converter or to perform as specific function as desired by secondary-side controller.

Figure 5:
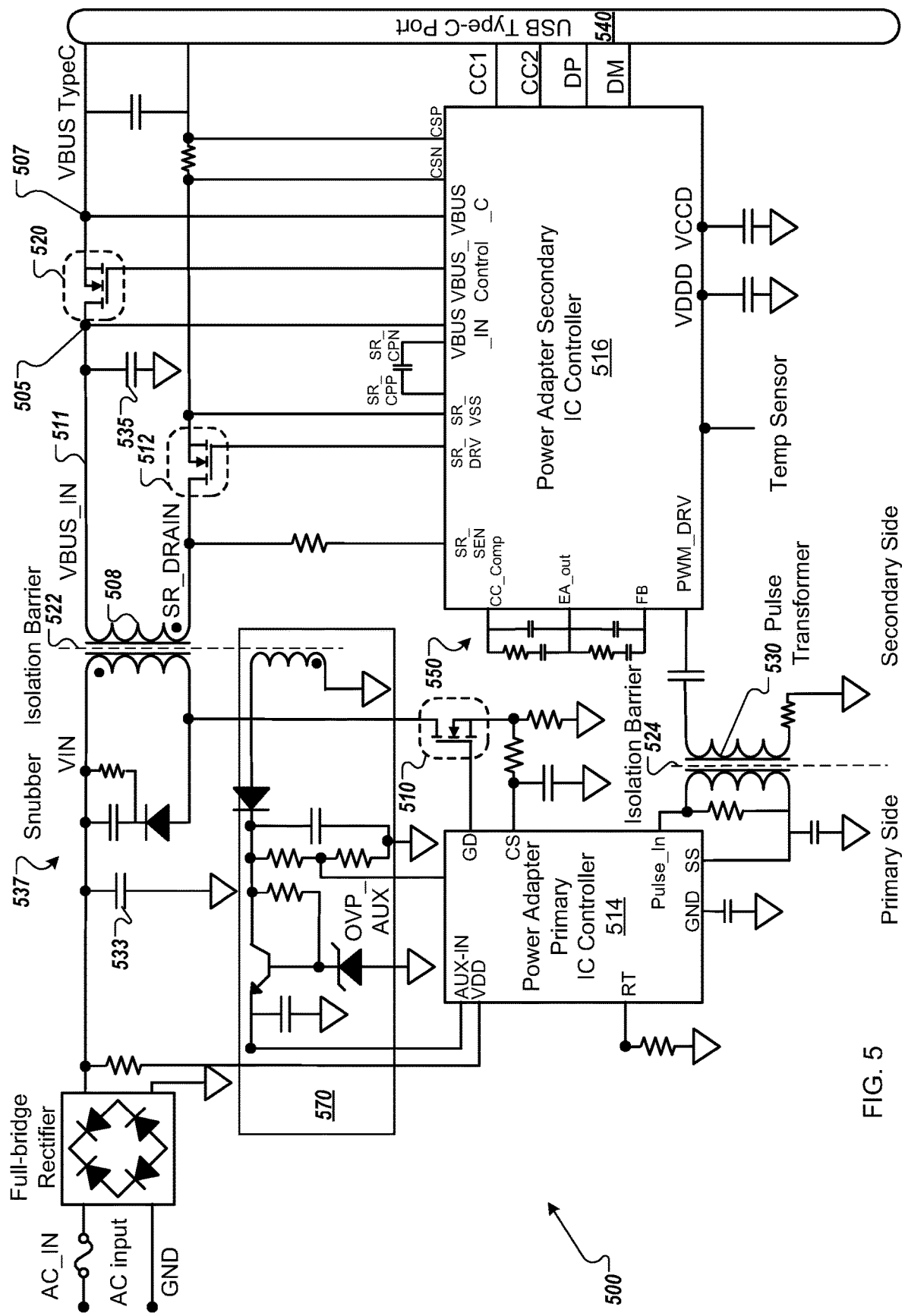
FIG. 5 is a schematic diagram of a USB-PD power adapter with bi-directional communications over an isolation barrier between a primary-side controller and a secondary-side controller according to one embodiment.

FIG. 5 is a schematic diagram of a USB-PD power adapter 500 with bi-directional communications over an isolation barrier between a primary-side controller and a secondary-side controller according to one embodiment. Instead of opto-isolator feedback, the USB-PD power adapter 500 includes bi-directional communication across the isolation barrier via a pulse transformer 530, a flyback transformer 508, or both. The USB-PD power adapter 500 includes a primary IC controller 514 and a secondary IC controller 516. The secondary IC controller 516 may be disposed in a chip package and includes a USB-PD subsystem configured in accordance with the techniques for gate driver control described herein. The secondary IC controller 516 is configured to negotiate a PD contract with a consumer device (not shown) attached to USB Type-C port 540 and to control through an output pin ("PWM_DRV") the required VBUS voltage that is output from flyback transformer 508. USB Type-C port 540 is typically associated with a Type-C plug, but it should be understood that in various embodiments the USB Type-C port may be associated with a Type-C receptacle instead. The flyback transformer 508 is coupled to a rectified DC power source and the output can be coupled to a secondary side FET 512 (e.g., SR FET 512). The VBUS_IN is regulated by an error amplifier which is connected to a compensation network 550. The compensation network 550 can be a resistor-capacitor (RC) circuit specific to the design of the USB-PD power adapter 500. The compensation network 550 can be coupled to receive a feedback signal from a first output pin ("FB") of the secondary IC controller 516. The compensation network 550 can also be coupled to a second output pin ("EA_out)" and a third output pin ("CC_Comp"). The flyback transformer 508 can be coupled to a large bulk capacitor 533, and a snubber circuit 537. The USB-PD power adapter 500 may also include the pulse transformer 530 (or other feedback control mechanisms) for communicating information across an isolation barrier 524.

The secondary IC controller 516 is coupled to VBUS line 511 and is configured to control the operation and state of power switches (such as provider switch 520) when fault conditions are detected by providing control signals to the gate of the switches. VBUS line 511 includes provider switch 520 configured as an on/off switch device controlled by signals from an output pin ("VBUS_Control") of a gate driver in the secondary IC controller 516. Provider switch 520 may correspond to a provider FET described herein. On one side of provider switch 520, a power source node 505 on the VBUS line 511 is coupled to second winding of the flyback transformer 508, which is coupled to a large bulk capacitor 535 configured to remove the AC component of the power signal. Power source node 505 is coupled to an input pin ("VBUS_IN") of the secondary IC controller 516. On the other side of provider switch 520, an output node 507 on the VBUS line 511 is coupled to USB Type-C port 540. Output node 507 is coupled to another input pin ("VBUS_C") of the secondary IC controller 516. The GND line of USB Type-C port 540 is coupled to a secondary power FET 512.

In operation, the direction of power flow on VBUS line 511 is from the flyback transformer 508 to a consumer device, such as a laptop computer (not shown), that is attached to USB Type-C port 540. When a PD contract with the consumer device is negotiated, the secondary IC controller 516 turns on the provider switch 520 to provide power to the consumer device at the negotiated voltage and/or current level(s). A high-to-low voltage transition on VBUS line 511 may be needed when the PD contract is dynamically re-negotiated to lower the VBUS voltage and/or current, e.g., when the consumer device has finished charging its battery and now needs power only to operate.

On detection of fault conditions, a control signal may be sent to turn off the provider switch 520, thereby disconnecting the USB Type-C port 540 from the flyback transformer 508. The provider switch 520 is turned off by driving the output of VBUS_Control to zero. This disconnection may be caused by an over-voltage condition, an over-current condition, or other conditions that may require disconnection of the USB Type-C port 540 from the flyback transformer 508 for protection of circuits coupled to the USB Type C port 540.

In a further embodiment, an auxiliary circuit 570 that can be coupled to the primary IC controller 514. An auxiliary output pin ("AUX_IN") and an overvoltage protection auxiliary pin ("OVP_AUX") are couple to the auxiliary circuit 570. The auxiliary circuit 570 can operate to protect for overvoltage of the VBUS_IN 511 and also provide power (AUX_IN) to the primary IC controller 514 once start-up is complete.

As noted above, the USB-PD power adapter 500 permits bi-directional communications over the isolation barrier 524, the isolation barrier 522, or both in a similar manner as described above with respect to FIGS. 1-4. In particular, a PWM driver circuit of the secondary IC controller 516 can output a signal on an output pin ("PWM_DRV") to communicate information across the isolation barrier 524 via the pulse transformer 530. As noted herein, PWM driver circuit can be other driver circuits that create pulses on the output pin to communicate information across the isolation barrier 524. The primary IC controller 514 can include a detection circuit that receives a signal on an input pin ("Pulse_In") and detects when the secondary IC controller 516 is communicating information. For example, the secondary IC controller 516 can detect a fault condition and can communicate this information to the primary IC controller 514 via the pulse transformer 530. In another embodiment, the primary IC controller 514 can communicate information across the isolation barrier 522 via the flyback transformer 508. The primary IC controller 514 can include a circuit to vary pulses received from the secondary IC controller 516 via the pulse transformer 530. By varying the pulses, the primary IC controller 514 can send information across the flyback transformer 508 via the primary power switch 510. The secondary IC controller 516 can include a circuit that measures the drain (SR_DRAIN) of the secondary power switch 512 and can detect when the primary IC controller 514 is communicating information. For example, the primary IC controller 514 can detect a fault condition and can communicate this information to the secondary IC controller 516 via the flyback transformer 508.

In another embodiment, an AC-DC power adapter device includes a flyback converter (with a flyback transformer) or an isolated power converter that is coupled between AC terminals and DC terminals. The flyback transformer converts AC power on the AC terminals to DC power on the DC terminals with galvanic isolation between the AC terminals and the DC terminals. The AC-DC power adapter device also includes a primary-side controller coupled to the flyback transformer and a secondary-side controller coupled to the flyback transformer. A primary-side power switch (also referred to as primary-side switching FET or primary FET) is coupled to a primary winding of the flyback transformer and the primary-side controller. A secondary-side power switch is coupled to a secondary winding of the flyback transformer and the secondary-side controller. The primary-side controller is configured to receive a first signal from the secondary-side controller across a galvanic isolation barrier and apply a second signal to the primary-side power switch in response to the first signal to turn-on and turn-off the primary-side power switch. The primary-side controller is also configured to communicate information to the secondary-side controller across the flyback transformer by varying a first pulse width of the second signal to a second pulse width and applying the second signal with the second pulse width to the primary-side power switch.

In a further embodiment, the primary-side controller includes a pulse receiver, a fault detection circuit, and a driver. The pulse receiver receives the first signal from the secondary-side controller across the galvanic isolation barrier. The first signal includes a first turn-on pulse to turn-on the primary-side power switch and a first turn-off pulse to turn-off the primary-side power switch. In response, the driver, which is coupled to the pulse receiver and the primary-side power switch, applies the first turn-on pulse and the first turn-off pulse to the primary-side power switch. The fault detection circuit detects a fault condition. In response, the fault detection circuit is configured to cause the pulse receiver to vary the first pulse width of the second signal to the second pulse width and cause the driver to apply the second signal with the second pulse width to the primary-side power switch. Applying the second signal with the second pulse width to the primary-side power switch causes the transfer of information (along with the transfer of energy) across the galvanic isolation barrier.

In a further embodiment, the AC-DC power adapter device includes a pulse transformer coupled between the primary-side controller and the secondary-side controller. The primary-side controller is configured to receive the first signal from the secondary-side controller as one or more pulses via the pulse transformer. The primary-side controller can detect when the secondary-side controller is communicating information via the pulse transformer as described herein.

The embodiments described herein can be implemented in a power delivery system, such as a serial bus-compatible power supply device. An example of a serial bus-compatible power supply device may include a serial bus power delivery (SBPD) device, a USB-compatible power supply device, or the like. In some embodiments, SBPD device is USB-PD device that is compatible with the USB-PD standard or more generally with the USB standard. For example, SBPD device may be used to provide an output voltage (e.g., Vbus_c, power supply voltage) based on an input voltage (e.g., Vbus_in, power supply voltage). The SBPD device may include the various embodiments described herein to facilitate communications between a primary-side controller and a secondary-side controller. The communications can be unidirectional or bi-directional as described herein. The SBPD device may include a power converter 150 (e.g., an AC-DC converter) and a power control analog subsystem (e.g., a USB-PD controller). The power control analog subsystem may include the circuitry, functionality, or both, as described herein for communicating information across a galvanic isolation barrier. The information can include information for different functions, such as OV, UV, OCP, SCP, PFC, SR, or the like. The information can include fault information for any of these different functions.

In embodiments, SBPD device is connected to power source, such as a wall socket power source that provides AC power. In other embodiments, power source may be a different power source, such as a battery, and may provide DC power to SBPD device. The Power converter may convert the power received from power source (e.g., convert power received to Vbus_in). For example, power converter may be an AC-DC converter and convert AC power from power source to DC power. In some embodiments, power converter is a flyback converter, such as a secondary-controlled flyback converter, that provides galvanic isolation between the input (e.g., primary side) and the output (e.g., secondary side).

In some embodiments, SBPD device provides Vbus_c to a sink device (e.g., via communication channel (CC) specifying a particular output voltage, and possibly an output current). SBPD device may also provide access to ground potential (e.g., ground) to the sink device. In some embodiments, the providing of the Vbus_c is compatible with the USB-PD standard. Power control analog subsystem may receive Vbus_in from power converter. The power control analog subsystem may output Vbus_in. In some embodiments, power control analog subsystem is a USB Type-C™ controller compatible with the USB Type-C™ standard. The power control analog subsystem may provide system interrupts responsive to the Vbus_in and the Vbus_c.

In some embodiments, any of the components of SBPD device may be part of an IC or alternatively any of the components of SBPD device may be implemented in its own IC. For example, power converter and power control analog subsystem may each be discrete ICs with separate packaging and pin configurations.

In some embodiments, the SBPD device may provide a complete USB Type-C™ and USB-Power Delivery port control solution for notebooks, dongles, monitors, docking stations, power adapters, vehicle chargers, power banks, mobile adaptors, and the like.

Figure 6:
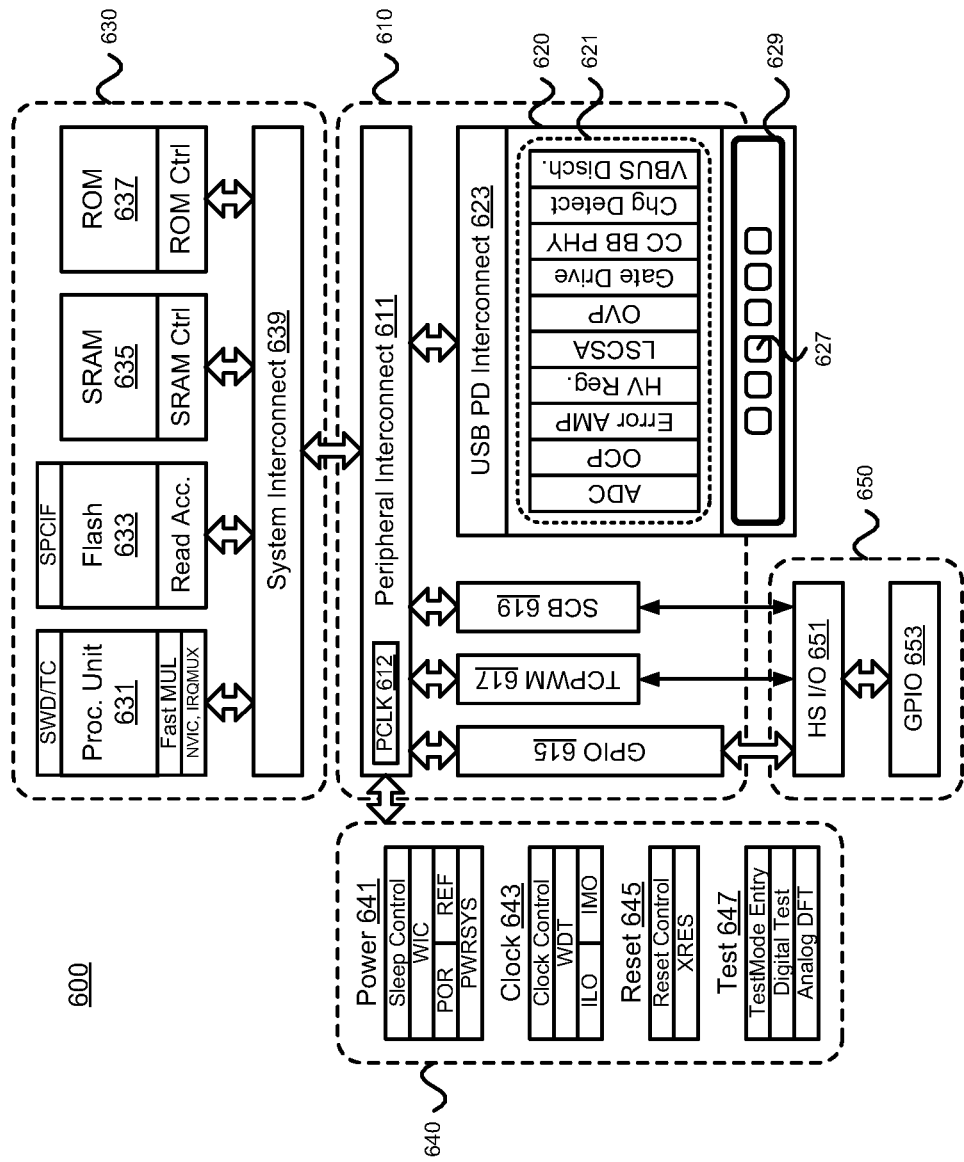
FIG. 6 is a block diagram illustrating a system for a USB device for use in USB power delivery in accordance with some embodiments.

FIG. 6 is a block diagram illustrating a system 600 for a USB device for use in USB power delivery in accordance with some embodiments. System 600 may include a peripheral subsystem 610 including a number of components for use in USB Power Delivery (USB-PD). Peripheral subsystem 610 may include a peripheral interconnect 611 including a clocking module, peripheral clock (PCLK) 612 for providing clock signals to the various components of peripheral subsystem 610. Peripheral interconnect 611 may be a peripheral bus, such as a single-level or multi-level advanced high-performance bus (AHB), and may provide a data and control interface between peripheral subsystem 610, CPU subsystem 630, and system resources 640. Peripheral interconnect 611 may include controller circuits, such as direct memory access (DMA) controllers, which may be programmed to transfer data between peripheral blocks without input by, control of, or burden on CPU subsystem 630.

The peripheral interconnect 611 may be used to couple components of peripheral subsystem 610 to other components of system 600. Coupled to peripheral interconnect 611 may be a number of general purpose input/outputs (GPIOs) 615 for sending and receiving signals. GPIOs 615 may include circuits configured to implement various functions such as pull-up, pull-down, input threshold select, input and output buffer enabling/disable, single multiplexing, etc. Still other functions may be implemented by GPIOs 615. One or more timer/counter/pulse-width modulator (TCPWM) 617 may also be coupled to the peripheral interconnect and include circuitry for implementing timing circuits (timers), counters, pulse-width modulators (PWMs) decoders, and other digital functions that may operate on I/O signals and provide digital signals to system components of system 600. Peripheral subsystem 610 may also include one or more serial communication blocks (SCBs) 619 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 610 may include a USB power delivery subsystem 620 coupled to the peripheral interconnect and comprising a set of USB-PD modules 621 for use in USB power delivery. USB-PD modules 621 may be coupled to the peripheral interconnect 611 through a USB-PD interconnect 623. USB-PD modules 621 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 600; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 621 may also include a charger detection module for determining that a charging circuit is present and coupled to system 600 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 620 may also include pads 627 for external connections and electrostatic discharge (ESD) protection circuitry 629, which may be required on a Type-C port. USB-PD modules 621 may also include a bi-directional communication module for supporting bi-directional communications with another controller, such as between a primary-side controller and a secondary-side controller of a flyback converter.

GPIO 615, TCPWM 617, and SCB 619 may be coupled to an input/output (I/O) subsystem 650, which may include a high-speed (HS) I/O matrix 651 coupled to a number of GPIOs 653. GPIOs 615, TCPWM 617, and SCB 619 may be coupled to GPIOs 653 through HS I/O matrix 651.

System 600 may also include a central processing unit (CPU) subsystem 630 for processing commands, storing program information, and data. CPU subsystem 630 may include one or more processing units 631 for executing instructions and reading from and writing to memory locations from a number of memories. Processing unit 631 may be a processor suitable for operation in an integrated circuit (IC) or a system-on-chip (SOC) device. In some embodiments, processing unit 631 may be optimized for low-power operation with extensive clock gating. In this embodiment, various internal control circuits may be implemented for processing unit operation in various power states. For example, processing unit 631 may include a wake-up interrupt controller (WIC) configured to wake the processing unit up from a sleep state, allowing power to be switched off when the IC or SOC is in a sleep state. CPU subsystem 630 may include one or more memories, including a flash memory 633, and static random access memory (SRAM) 635, and a read-only memory (ROM) 637. Flash memory 633 may be a non-volatile memory (NAND flash, NOR flash, etc.) configured for storing data, programs, and/or other firmware instructions. Flash memory 633 may include a read accelerator and may improve access times by integration within CPU subsystem 630. SRAM 635 may be a volatile memory configured for storing data and firmware instructions accessible by processing unit 631. ROM 637 may be configured to store boot-up routines, configuration parameters, and other firmware parameters and settings that do not change during operation of system 600. SRAM 635 and ROM 637 may have associated control circuits. Processing unit 631 and the memories may be coupled to a system interconnect 639 to route signals to and from the various components of CPU subsystem 630 to other blocks or modules of system 600. System interconnect 639 may be implemented as a system bus such as a single-level or multi-level AHB. System interconnect 639 may be configured as an interface to couple the various components of CPU subsystem 630 to each other. System interconnect 639 may be coupled to peripheral interconnect 611 to provide signal paths between the components of CPU subsystem 630 and peripheral subsystem 610.

System 600 may also include a number of system resources 640, including a power module 641, a clock module 643, a reset module 645, and a test module 647. Power module 641 may include a sleep control module, a wake-up interrupt control (WIC) module, a power-on-reset (POR) module, a number of voltage references (REF), and a PWRSYS module. In some embodiments, power module 641 may include circuits that allow system 600 to draw and/or provide power from/to external sources at different voltage and/or current levels and to support controller operation in different power states, such as active, low-power, or sleep. In various embodiments, more power states may be implemented as system 600 throttles back operation to achieve a desired power consumption or output. Clock module 643 may include a clock control module, a watchdog timer (WDT), an internal low-speed oscillator (ILO), and an internal main oscillator (IMO). Reset module 645 may include a reset control module and an external reset (XRES) module. Test module 647 may include a module to control and enter a test mode as well as testing control modules for analog and digital functions (digital test and analog DFT).

System 600 may be implemented in a monolithic (e.g., single) semiconductor die. In other embodiments, various portions or modules of system 600 may in implemented on different semiconductor dies. For example, memory modules of CPU subsystem 630 may be on-chip or separate. In still other embodiments, separate-die circuits may be packaged into a single "chip," or remain separate and disposed on a circuit board (or in a USB cable connector) as separate elements.

System 600 may be implemented in a number of application contexts to provide USB-PD functionality thereto. In each application context, an IC controller or SOC implementing system 600 may be disposed and configured in an electronic device (e.g., a USB-enabled device) to perform operations in accordance with the techniques described herein. In one example embodiment, a system 600 may be disposed and configured in a personal computer (PC) power adapter for a laptop, a notebook computer, etc. In another example embodiment, system 600 may be disposed and configured in a power adapter (e.g., a wall charger) for a mobile electronic device (e.g., a smartphone, a tablet, etc.). In another example embodiment, system 600 may be disposed and configured in a wall socket that is configured to provide power over USB Type-A and/or Type-C port(s). In another example embodiment, system 600 may be disposed and configured in a car charger that is configured to provide power over USB Type-A and/or Type-C port(s). In yet another example embodiment, system 600 may be disposed and configured in a power bank that can get charged and then provide power to another electronic device over a USB Type-A or Type-C port. In other embodiments, a system like system 600 may be configured with the power switch gate control circuitry described herein and may be disposed in various other USB-enabled electronic or electro-mechanical devices.

It should be understood that a system, like system 600 implemented on or as an IC controller may be disposed into different applications, which may differ with respect to the type of power source being used and the direction in which power is being delivered. For example, in the case of a car charger, the power source is a car battery that provides DC power, while in the case of a mobile power adapter the power source is an AC wall socket. Further, in the case of a PC power adapter the flow of power delivery is from a provider device to consumer device, while in the case of a power bank the flow of power delivery may be in both directions depending on whether the power bank is operating as a power provider (e.g., to power another device) or as a power consumer (e.g., to get charged itself). For these reasons, the various applications of system 600 should be regarded in an illustrative rather than a restrictive sense.

Figure 7:
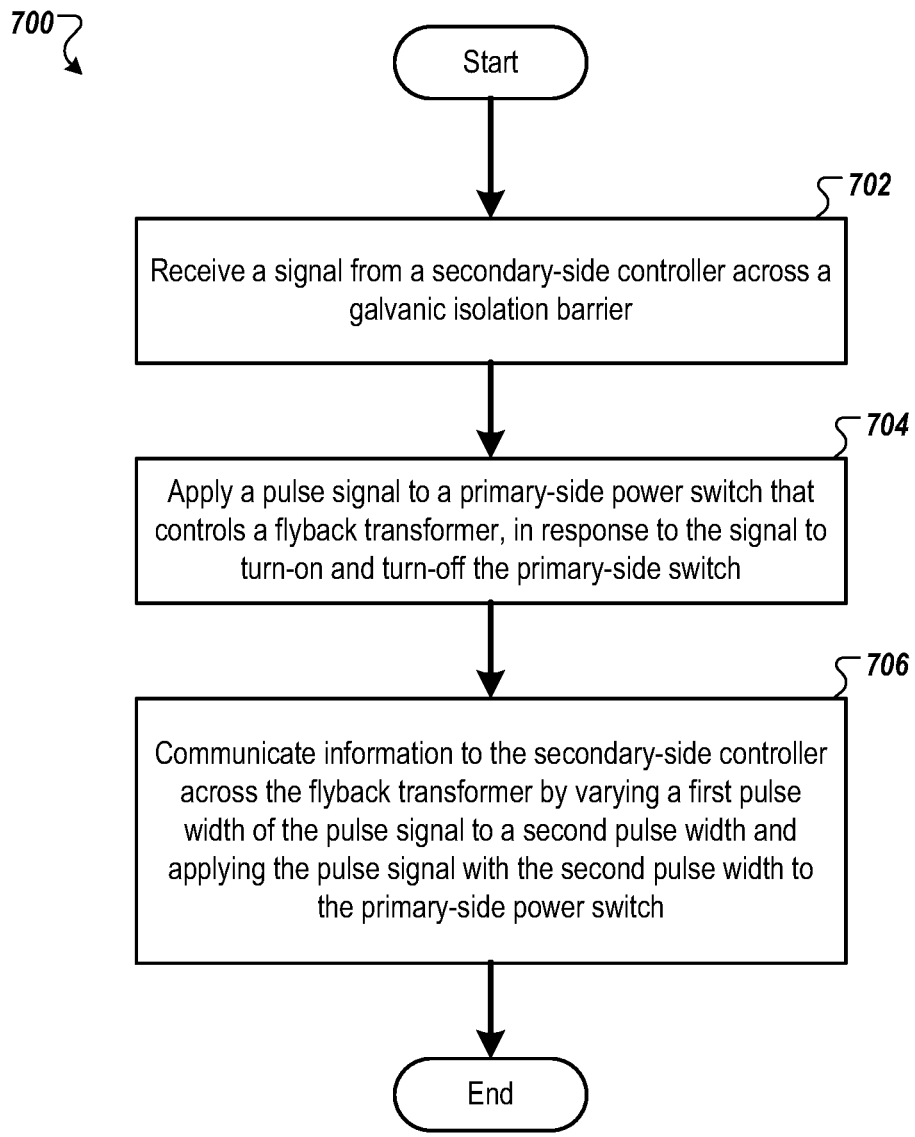
FIG. 7 is a flow diagram of a method of communicating information to a secondary-side controller across a galvanic isolation barrier according to one embodiment.

FIG. 7 is a flow diagram of a method 700 of communicating information to a secondary-side controller across a galvanic isolation barrier according to one embodiment. The method 700 may be performed by processing logic that comprises hardware (e.g., circuitry, dedicated logic, programmable logic, microcode, etc.), software, firmware, or a combination thereof. In one embodiment, a primary-side controller in a secondary-controlled AC-DC flyback converter performs the method 700. In another embodiment, the primary-side controller 114 of FIG. 1 performs the method 700. In another embodiment, the primary-side controller 314 of FIG. 3 performs the method 700. In another embodiment, the primary IC controller 514 of FIG. 5 performs the method 700. In another embodiment, the peripheral subsystem 610 of FIG. 6 performs the method 700. In some cases, the operations of method 700 can be distributed between the primary-side controller and the secondary-side controller.

Referring to FIG. 7, the method 700 begins by the processing logic receiving a signal from a secondary-side controller across a galvanic isolation barrier (block 702). The processing logic applies a pulse signal to a primary-side power switch (e.g., primary-side FET), coupled to a flyback transformer in a secondary-controlled AC-DC flyback converter, in response to the signal to turn-on and turn-off the primary-side power switch (block 704). The processing logic communicates information to the secondary-side controller across the flyback transformer by varying a first pulse width of the pulse signal to a second pulse width and applying the pulse signal with the second pulse width to the primary-side power switch (block 706), and the method 700 ends.

In another embodiment, the processing logic receives a signal from a secondary-side controller across a galvanic isolation barrier. The processing logic generates a first pulse signal in response to the signal, the first pulse signal comprising one or more pulses with a first pulse width. The processing logic generates a second pulse signal that varies the first pulse width of at least one pulse of the first pulse signal. The processing logic outputs the second pulse signal to a primary switching FET of the power converter to communicate information from the primary-side controller to the secondary-side controller across the galvanic isolation barrier.

In a further embodiment, the processing logic generates one or more pulses with the first pulse width in response to the signal. The processing logic varies the first pulse width by generating one or more additional pulses with the second pulse width. The processing logic detects a fault condition. The processing logic communicates information about the fault condition to the secondary-side controller across the flyback transformer by applying the one or more additional pulses with the second pulse width.

In a further embodiment, the processing logic receives the signal from the secondary-side controller by receiving the signal from the secondary-side controller across the galvanic isolation barrier via a pulse transformer coupled between the primary-side controller and the secondary-side controller. The signal includes pulse information to turn-on and turn-off the primary-side FET. In some cases, the pulse receiver generates the pulse signal with one or more pulses with the first pulse width in response to the signal received from the secondary-side controller across the galvanic isolation barrier. Processing logic can vary the first pulse width of the pulse signal to the second pulse width by generating the pulse signal with one or more additional pulses with the second pulse width.

In another embodiment, to apply the pulse signal with the second pulse width, the processing logic drives a gate of the primary-side FET with one or more pulses with the second pulse width. The one or more pulses with the second pulse width turn the primary-side FET on and off to control the flyback transformer.

In another embodiment, to communication information to the secondary-side controller across the flyback transformer, the processing logic varies the first pulse width of the pulse signal to generate a specific pattern in the pulse signal. The specific pattern in the pulse signal corresponds to a fault condition.

In another embodiment, the processing logic detects a first fault condition and a second fault condition. The processing logic, to communicate information to the secondary-side controller across the flyback transformer by varying the first pulse width of the pulse signal to generate a first specific pattern in the pulse signal in response to detecting the first fault condition. The first specific pattern in the pulse signal corresponds to the first fault condition. The processing logic can also vary the first pulse width of the pulse signal to generate a second specific pattern in the pulse signal in response to detecting the second fault condition. The second specific pattern in the pulse signal corresponds to the second fault condition.

In another embodiment, to communicate information to the secondary-side controller across the flyback transformer, the processing logic communicates the information from the primary-side controller to the secondary-side controller without clock synchronization of the primary-side controller and the secondary-side controller. In another embodiment, the processing logic communicates the information from the primary-side controller to the secondary-side controller without an input buffer and an output buffer disposed between the primary-side controller and the secondary-side controller.

Figure 8:
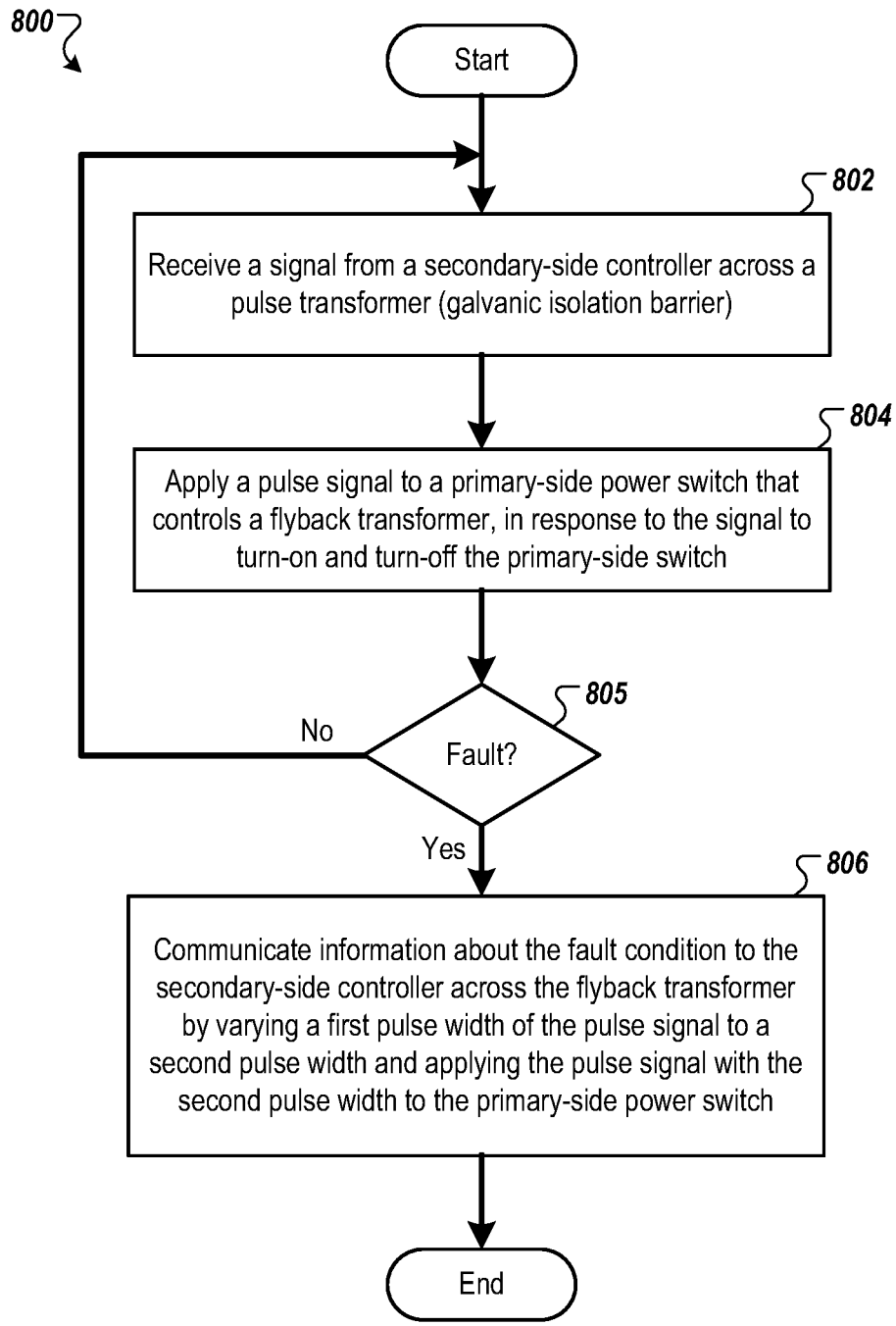
FIG. 8 is a flow diagram of a method of detecting a fault condition and communicating information about the fault condition to a secondary-side controller across a galvanic isolation barrier according to one embodiment.

FIG. 8 is a flow diagram of a method 800 of detecting a fault condition and communicating information about the fault condition to a secondary-side controller across a galvanic isolation barrier according to one embodiment. The method 800 may be performed by processing logic that comprises hardware (e.g., circuitry, dedicated logic, programmable logic, microcode, etc.), software, firmware, or a combination thereof. In one embodiment, a primary-side controller in a secondary-controlled AC-DC flyback converter performs the method 800. In another embodiment, the primary-side controller 114 of FIG. 1 performs the method 800. In another embodiment, the primary-side controller 314 of FIG. 3 performs the method 800. In another embodiment, the primary IC controller 514 of FIG. 5 performs the method 800. In another embodiment, the peripheral subsystem 610 of FIG. 6 performs the method 800. In some cases, the operations of method 700 can be distributed between the primary-side controller and the secondary-side controller.

Referring to FIG. 8, the method 800 begins by the processing logic receiving a signal from a secondary-side controller across a pulse transformer (first galvanic isolation barrier) (block 802). The processing logic applies a pulse signal to a primary-side power switch that controls a flyback transformer, in response to the signal to turn-on and turn-off the primary-side switch (block 804) The processing logic determines whether a fault condition has occurred (block 805). When no fault condition has occurred at block 805, the processing logic returns to block 802 to receive another signal from the secondary-side controller. When a fault condition is determined to occur at block 805, the processing logic communicates information about the fault to the secondary-side controller across the flyback transformer (second galvanic isolation barrier) (block 806). At block 806, the processing logic can communicate the information about the fault condition by varying a first pulse width of the pulse signal to a second pulse width and applying the pulse signal with the second pulse width to the primary-side power switch, and the method 800 ends.

The methods above set for various embodiments of sending information from the primary-side controller to the secondary-side controller over a galvanic isolation barrier, such as via the flyback transformer itself. Described below are methods of sending information from the secondary-side controller to the primary-side controller over a galvanic isolation barrier, such as via the pulse transformer.

In one embodiment, the method includes sending, by a secondary-side controller in a secondary-controlled alternating current to direct current (AC-DC) flyback converter, a pulse signal to a primary-side controller across a galvanic isolation barrier, the primary-side controller applying the pulse signal to a primary-side FET to turn-on or turn-off a flyback transformer in the secondary-controlled AC-DC flyback converter. The method further includes sending, by the secondary-side controller, an information signal across the galvanic isolation barrier, the information signal comprising at least two consecutive ones or two consecutive zeros. In some cases, the method sends the information signal by varying a pulse sequence to include the at least two consecutive ones or two consecutive zeros. In another embodiment, the secondary-side controller sends the information signal via a pulse transformer. The secondary-side controller can include a programmable driver comprising a pull-up transistor, a pull-down transistor, a programmable resistive element (e.g., resistor) that can be selective added to the pull-up transistor, the pull-down transistor, or both, to generate the pulse sequence, such as two consecutive zeroes or two consecutive ones.

In some embodiments, the information signal includes information about a fault condition. In another embodiment, the method detects, by the secondary-side controller, a fault condition and sends information about the fault condition in the information signal across the galvanic isolation barrier. In some cases, two consecutive zeros represent a fault condition. In another embodiment, the two consecutive zeros represent a header or marker that notifies the primary-side controller that the secondary-side controller is going to send a fault code. The fault code can be any combination of ones and zeros and can be a predefined size. Alternatively, two consecutive ones can be used for the fault condition or the header or marker of a fault code. The method can generate two consecutive zeros with two negative pulses without any fast clock synchronization with the primary-side controller.

Figure 9:
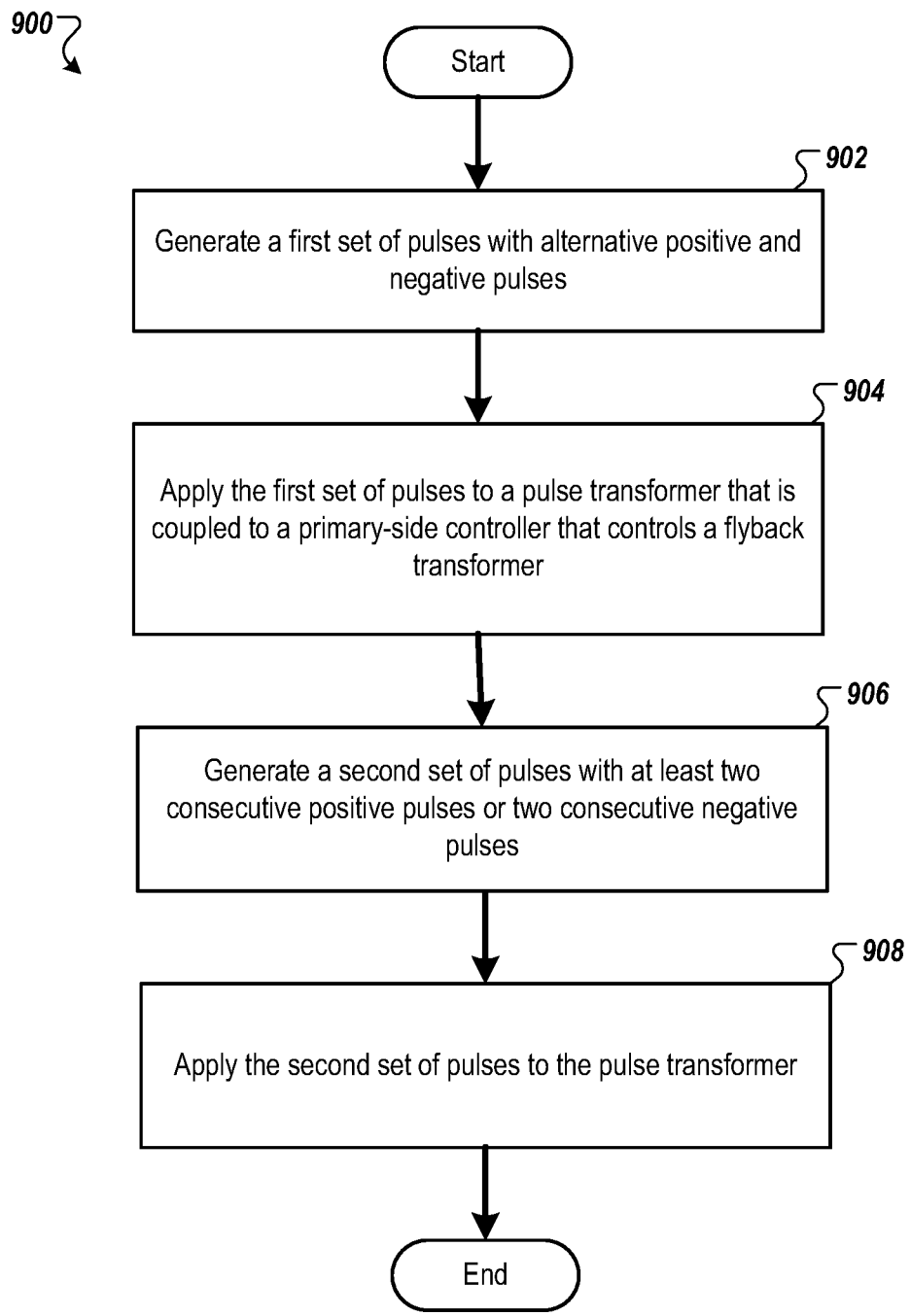
FIG. 9 is a flow diagram of a method of communicating information to a primary-side controller across a galvanic isolation barrier according to one embodiment.

FIG. 9 is a flow diagram of a method 900 of communicating information to a primary-side controller across a galvanic isolation barrier according to one embodiment. The method 900 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 900. In another embodiment, the secondary-side controller 116 of FIG. 1 performs the method 900. In another embodiment, the secondary-side controller 316 of FIG. 3 performs the method 900. In another embodiment, the secondary IC controller 516 of FIG. 5 performs the method 900. In another embodiment, the peripheral subsystem 610 of FIG. 6 performs the method 900. In some cases, the operations of method 900 can be distributed between the primary-side controller and the secondary-side controller.

Referring to FIG. 9, the method 900 begins by the processing logic generating a first set of pulses with alternating positive and negative pulses (block 902). The first set of pulses can include a positive pulse on a positive transition of a square wave signal (i.e., rising edge) and a negative pulse on a negative transition of the square wave signal (i.e., falling edge). The processing logic applies the first set of pulses to a pulse transformer coupled to a primary-side controller (block 904). The first set of pulses causes the primary-side controller to turn-on and turn-off a primary-side FET coupled to the primary-side controller. When the secondary-side controller needs to send information to the primary-side controller, the processing logic generates a second set of pulses with at least two consecutive positive pulses or two consecutive negative pulses (block 906). The second set of pulses can include a first positive pulse on a first positive transition of a sawtooth wave signal (i.e., slow rising edge) with a first negative transition that is faster than the first positive transition and a second positive pulse on a second positive transition of the sawtooth wave signal with a second negative transition that is faster than the second positive transition. The processing logic applies the second set of pulses to the pulse transformer (block 908), and the method 900 ends. The second set of pulses cause the primary-side controller to receive information from the secondary-side controller across a galvanic isolation barrier. In other embodiments, the secondary-side controller can communicate information to the primary-side controller over a galvanic isolation barrier between the primary-side controller and the secondary-side controller.

Figure 10:
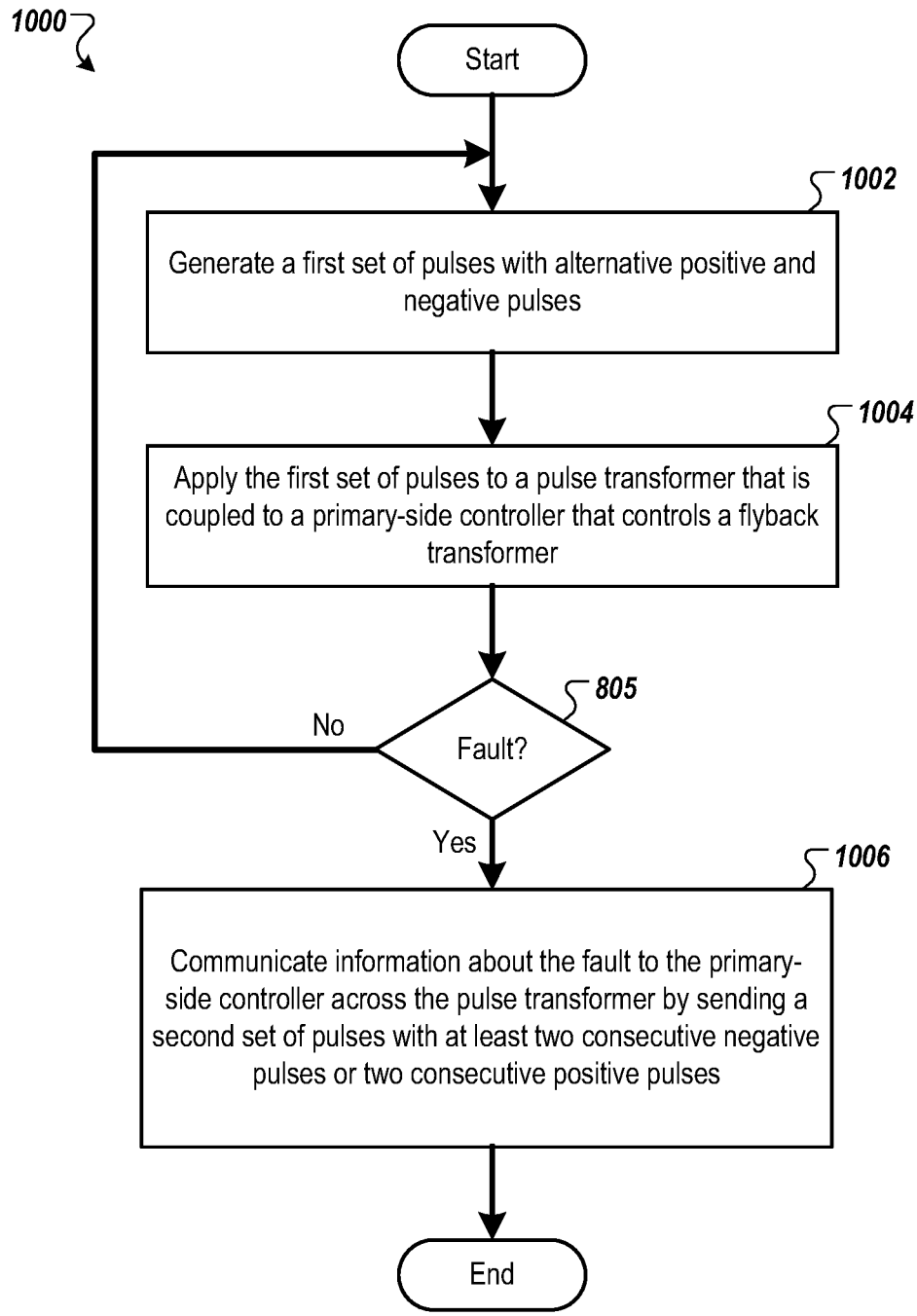
FIG. 10 is a flow diagram of a method of detecting a fault condition and communicating information about the fault condition to a primary-side controller across a galvanic isolation barrier according to one embodiment.

FIG. 10 is a flow diagram of a method 1000 of detecting a fault condition and communicating information about the fault condition to a primary-side controller across a galvanic isolation barrier according to one embodiment. The method 1000 may be performed by processing logic that comprises hardware (e.g., circuitry, dedicated logic, programmable logic, microcode, etc.), software, firmware, or a combination thereof. In one embodiment, a secondary-side controller in a secondary-controlled AC-DC flyback converter performs the method 1000. In another embodiment, the secondary-side controller 116 of FIG. 1 performs the method 1000. In another embodiment, the secondary-side controller 316 of FIG. 3 performs the method 1000. In another embodiment, the secondary IC controller 516 of FIG. 5 performs the method 1000. In another embodiment, the peripheral subsystem 610 of FIG. 6 performs the method 900. In some cases, the operations of method 1000 can be distributed between the primary-side controller and the secondary-side controller.

Referring to FIG. 10, the method 1000 begins by the processing logic generating a first set of pulses with alternating positive and negative pulses (block 1002). The first set of pulses can include a positive pulse on a positive transition of a square wave signal (i.e., rising edge) and a negative pulse on a negative transition of the square wave signal (i.e., falling edge). The processing logic applies the first set of pulses to a pulse transformer coupled to a primary-side controller (block 1004). The first set of pulses causes the primary-side controller to turn-on and turn-off a primary-side FET coupled to the primary-side controller.

The processing logic determines whether a fault condition has occurred (block 1005). When no fault condition has occurred at block 1005, the processing logic returns to block 1002 to receive another signal from the secondary-side controller. When a fault condition is determined to occur at block 1005, the processing logic communicates information about the fault to the primary-side controller across the pulse transformer (galvanic isolation barrier) (block 1006). At block 1006, the processing logic can communicate the information about the fault condition by sending a second set of pulses with at least two consecutive negative pulses or two consecutive positive pulses, and the method 1000 ends.

In another embodiment, the processing logic determines that the fault condition requires a system shutdown and initiates, such as by firmware, the sending of the information to the primary-side controller to initiate the system shutdown. This can be done after the secondary-side controller detects the fault condition and determines that the fault condition requires the system shutdown.

In another embodiment, the processing logic controls a programmable slow pull-up transistor at an input of the pulse transformer followed by a faster pull-down transistor to generate a first negative pulse. The processing logic controls the programmable slow pull-up transistor at the input of the pulse transformer followed by the faster pull-down transistor to generate a second negative pulse without an intervening positive pulse (e.g., two –ve edges without a +ve edge). In one embodiment, the processing logic controls the programmable slow pull-up transistor with a resistive pull-up transistor (or a resistive pull-down transistor). In another embodiment, the processing logic controls the programmable slow pull-up transistor with a current source-based pull-up transistor. In another embodiment, the processing logic controls a programmable slow pull-down transistor at an input of the pulse transformer followed by a faster pull-up transistor to generate a first positive pulse and controlling the programmable slow pull-down transistor at the input of the pulse transformer followed by the faster pull-up transistor to generate a second positive pulse without an intervening negative pulse (e.g., two +ve edges without a –ve edge). The two or more consecutive ones or a pattern of zeros and ones can be used to communicate multiple fault conditions or other information from secondary-side controller to the primary-side controller. The specific pattern can include a Start pattern, a Stop pattern, a Soft Fault asking for soft-start, a Soft Fault asking for a minimum power delivered and many more.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a primary-side controller of a Universal Serial Bus Power Delivery (USB-PD) device from a secondary-side controller of the USB-PD device, a control signal across a galvanic isolation barrier;
   converting, by the primary-side controller, the control signal into a first pulse signal with a first pulse width;
   applying, by the primary-side controller, the first pulse signal to a primary-side power switch to control the primary-side power switch;
   detecting, by the primary-side controller, that a first fault condition has occurred;
   communicating, by the primary-side controller, a first information signal about the first fault condition to the secondary-side controller across the galvanic isolation barrier, wherein the first information signal is generated by converting the control signal into a second pulse signal with a second pulse width that is different than the first pulse width;
   detecting, by the secondary-side controller, that a second fault condition has occurred; and
   communicating, by the secondary-side controller, a second information signal about the second fault condition to the primary-side controller across the galvanic isolation barrier by varying a pulse sequence of the control signal received by the primary-side controller to include a specific pattern of ones and zeros that corresponds to the second fault condition, wherein the specific pattern of ones and zeros includes one of a start pattern, a stop pattern, a shutdown pattern, a first soft-fault pattern requesting a soft-start operation, and a second soft-fault pattern requesting a minimum delivery of power.

2. The method of claim 1, wherein receiving the control signal from the secondary-side controller comprises receiving the control signal across the galvanic isolation barrier via a pulse transformer coupled between the primary-side controller and the secondary-side controller.

3. The method of claim 1, wherein converting the control signal into the first pulse signal and converting the control signal into the second pulse signal comprises using a pulse receiver of the primary-side controller to generate the first pulse signal with the first pulse width and to generate the second pulse signal with the second pulse width.

4. The method of claim 3, wherein using the pulse receiver of the primary-side controller further comprises one or more of:
   generating first one or more additional pulses with the first pulse width to vary the first pulse signal; and
   generating second one or more additional pulses with the second pulse width to vary the second pulse signal.

5. The method of claim 1, further comprising:
   determining, by the secondary-side controller, that the second fault condition requires a system shutdown; and
   initiating, by the primary-side controller, a shutdown of the USB-PD device in response to receiving the second information signal.

6. The method of claim 1, wherein communicating the first information signal to the secondary-side controller comprises communicating the first information signal from the primary-side controller to the secondary-side controller without clock synchronization of the primary-side controller and the secondary-side controller.

7. The method of claim 1, wherein communicating the first information signal to the secondary-side controller comprises communicating the first information signal from the primary-side controller to the secondary-side controller without an input buffer and an output buffer disposed between the primary-side controller and the secondary-side controller.

8. A Universal Serial Bus Power Delivery (USB-PD) device, the USB-PD device comprising:
   a primary-side integrated circuit (IC) controller;
   a primary-side power switch coupled to the primary-side IC controller;
   a flyback transformer coupled to the primary-side power switch;
   a secondary-side power switch coupled to the flyback transformer; and
   a secondary-side IC controller coupled to the secondary-side power switch;
   wherein the primary-side IC controller is configured to:
      receive a control signal from the secondary-side IC controller across a galvanic isolation barrier;
      convert the control signal into a first pulse signal with a first pulse width;
      apply the first pulse signal to control the primary-side power switch;
      detect that a first fault condition has occurred; and
      communicate a first information signal about the first fault condition to the secondary-side IC controller across the galvanic isolation barrier, wherein the first information signal is generated by converting the control signal into a second pulse signal with a second pulse width that is different than the first pulse width; and
   wherein the secondary-side IC controller is configured to:
      detect that a second fault condition has occurred; and
      communicate a second information signal about the second fault condition to the primary-side IC controller across the galvanic isolation barrier by varying a pulse sequence of the control signal provided to the primary-side IC controller to include a specific pattern of ones and zeros that corresponds to the second fault condition, wherein the specific pattern of ones and zeros includes one of a start pattern, a stop pattern, a shutdown pattern, a first soft-fault pattern requesting a soft-start operation, and a second soft-fault pattern requesting a minimum delivery of power.

9. The USB-PD device of claim 8, further comprising a pulse transformer coupled between the primary-side IC controller and the secondary-side IC controller to provide the galvanic isolation barrier, wherein the primary-side IC controller is configured to receive the control signal as one or more pulses via the pulse transformer.

10. The USB-PD device of claim 8, wherein the primary-side IC controller comprises:
   a pulse receiver configured to receive the control signal from the secondary-side IC controller across the galvanic isolation barrier; and
   a gate driver coupled to the pulse receiver and to a gate of the primary-side power switch.

11. The USB-PD device of claim 10, wherein:
   the pulse receiver is configured to convert the control signal into the first pulse signal and to convert the control signal into the second pulse signal; and
   the primary-side IC controller is configured to provide the first pulse signal and the second pulse signal to the gate driver.

12. The USB-PD device of claim 8, wherein the primary-side IC controller comprises a fault detection circuit configured to detect multiple types fault conditions that include the first fault condition.

13. The USB-PD device of claim 8, wherein the secondary-side IC controller comprises a signal generator circuit configured to generate the pulse sequence of the control signal provided to the primary-side IC controller.

14. The USB-PD device of claim 8, wherein the secondary-side IC controller comprises a negative sensing (NSN) circuit configured to detect the first information signal communicated by the primary-side IC controller.

15. The USB-PD device of claim 8, wherein the secondary-side IC controller comprises a zero crossing detect (ZCD) circuit configured to detect the first information signal communicated by the primary-side IC controller.

16. The USB-PD device of claim 8, further comprising:
   an alternating current (AC) input terminals;
   a rectifier coupled between the AC input terminals and a primary winding of the flyback transformer;
   a direct current (DC) output (VBUS) line coupled to a secondary winding of the flyback transformer; and
   a USB Type-C port coupled to the VBUS line and to the secondary-side IC controller.

\* \* \* \* \*